(12) United States Patent  
Murashima et al.

(10) Patent No.: US 8,368,799 B2
(45) Date of Patent: Feb. 5, 2013

(54) MOUNT ADAPTER AND IMAGING DEVICE

(75) Inventors: Nobuharu Murashima, Nara (JP); Tomohisa Nara, Tokyo (JP); Akio Kimba, Osaka (JP)

(73) Assignee: Sony Corporation, Tokyo (JP)

( * ) Notice: Subject to any disclaimer, the term of this patent is extended or adjusted under 35 U.S.C. 154(b) by 28 days.

(21) Appl. No.: 13/179,802

(22) Filed: Jul. 11, 2011

(65) Prior Publication Data

US 2012/0044407 A1 Feb. 23, 2012

(30) Foreign Application Priority Data

Aug. 20, 2010 (JP) ................................. 2010-184620

(51) Int. Cl.
*H04N 5/232* (2006.01)
(52) U.S. Cl. ........................................ 348/345; 348/180
(58) Field of Classification Search .......................... None
See application file for complete search history.

(56) References Cited

U.S. PATENT DOCUMENTS

| | | | |
|---|---|---|---|
| 7,085,485 B2 * | 8/2006 | Sugita et al. ..................... 396/71 |
| 7,260,322 B2 * | 8/2007 | Ide et al. .......................... 396/71 |
| 2003/0173494 A1 * | 9/2003 | Nakamura ................... 250/201.2 |
| 2005/0140815 A1 * | 6/2005 | Nakano et al. ................. 348/345 |
| 2005/0237417 A1 * | 10/2005 | Miyasaka ....................... 348/335 |
| 2007/0047953 A1 * | 3/2007 | Kawai ............................ 396/544 |
| 2010/0091175 A1 | 4/2010 | Shintani et al. |

FOREIGN PATENT DOCUMENTS

WO    WO 2008/099605 A1    8/2007

* cited by examiner

*Primary Examiner* — Chieh M Fan
*Assistant Examiner* — Angel L Garces-Rivera
(74) *Attorney, Agent, or Firm* — Oblon, Spivak, McClelland, Maier & Neustadt, L.L.P.

(57) ABSTRACT

A mount adapter includes: a camera cone having a length of adjusting a flange focal length between an imaging device provided with an imaging element and an interchangeable lens; a focus detection unit carrying out focus detection from a phase difference; an optical device separating an incident light from the interchangeable lens into an incident light of the imaging element and an incident light of the focus detection unit; and a correction information storage unit storing correction information used for correction of an error between the flange focal length and a distance from a mounting surface of the interchangeable lens to the focus detection unit.

17 Claims, 8 Drawing Sheets

| TEMPERATURE | CORRECTION AMOUNT |
|---|---|
| 0°C | dm0 |
| 1°C | dm1 |
| ... | ... |
| 20°C | dm20 |
| ... | ... |
| 40°C | dm40 |

| TEMPERATURE | CORRECTION AMOUNT |
|---|---|
| 0°C | db0 |
| 1°C | db1 |
| ... | ... |
| 20°C | db20 |
| ... | ... |
| 40°C | db40 |

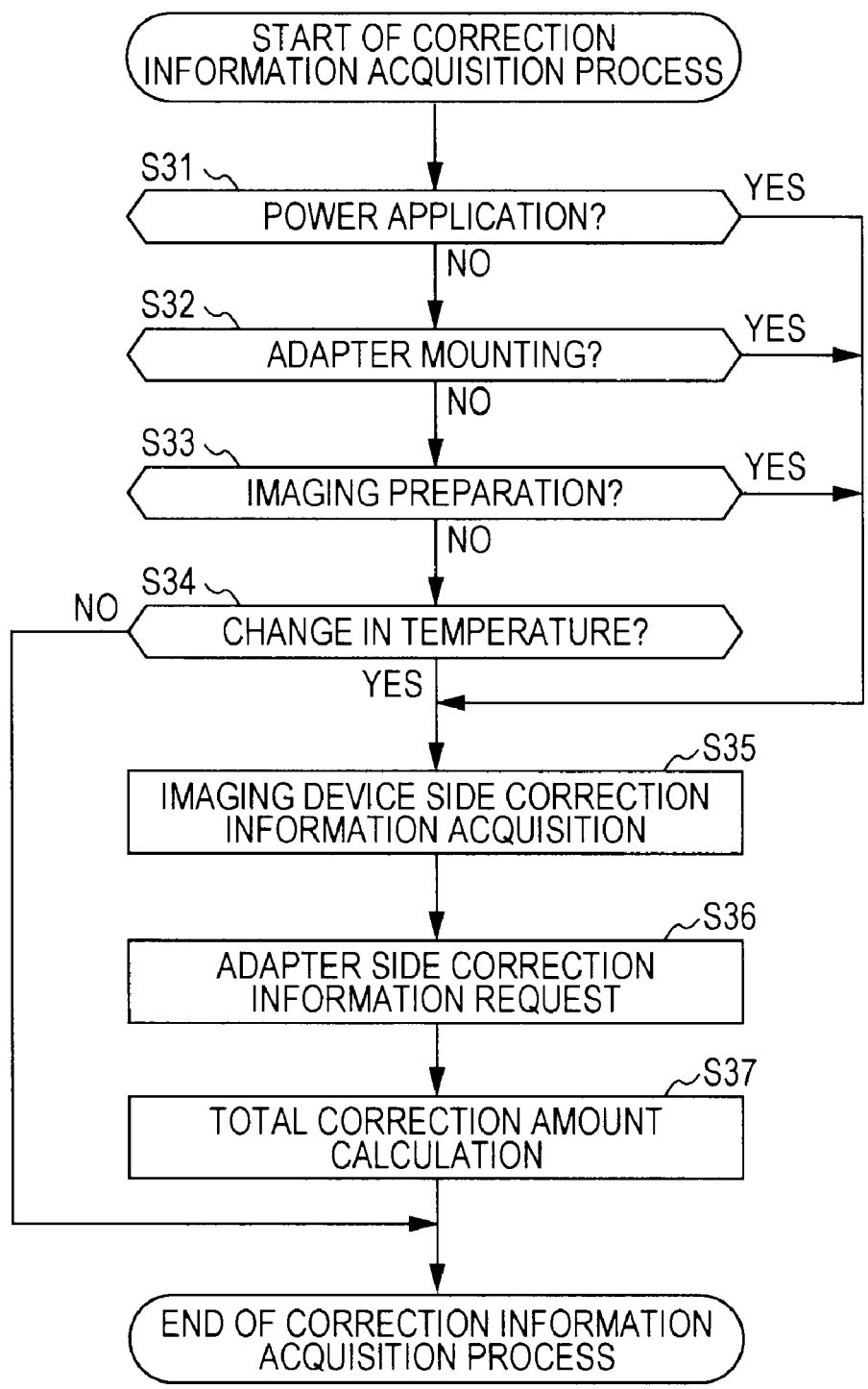

MOUNT ADAPTER AND IMAGING DEVICE

BACKGROUND

The present disclosure relates to a mount adapter and an imaging device.

Although digital single-lens reflex cameras have widely spread rapidly in recent years, they have not been able to meet a request for further reduction in size and weight of the body. This is considered as inevitable for a digital single-lens reflex camera to put a reflex mirror that switches an optical imaging path and an optical path for the finder and a pentaprism that guides a subject image to the finder (OVF: optical view finder) in the camera body.

With that, by being provided with an electric view finder (EVF) instead of an OVF, mirrorless digital single-lens cameras, which intend reduction in size and weight by eliminating the reflex mirror, have appeared. However, a sub-mirror that guides an incident light to a focus detection unit is eliminated from such a mirrorless digital single-lens camera as well as the reflex mirror, thereby not being able to carry out focus detection of a phase difference detection system by the camera main body.

Since a mirrorless digital single-lens camera has a shortened flange focal length compared to that of a digital single-lens reflex camera, interchangeable lenses used to be mountable to a digital single-lens reflex camera are difficult to be used on their own. With that, in order to effectively utilize the interchangeable lens resources in the past, an interchangeable lens for a digital single-lens reflex camera is mountable to a mirrorless digital single-lens camera by being mediated by a mount adapter.

Then, in order to make an interchangeable lens compliant with the phase difference detection system mountable, there is proposed an imaging device having the mount adapter that is provided with a focus detection unit of a phase difference detection system (for example, refer to International Publication No. 2008/099605).

SUMMARY

However, the proposed imaging device used to have a disadvantage of increasing an error of the AF (auto focus) sensor focal length desired to be equivalent to the flange focal length by mounting a mount adapter to be an intermediate accessory between the camera body and the interchangeable lens. The AF sensor focal length is a distance from the mounting surface of the interchangeable lens to the AF sensor, and the error of the AF sensor focal length becomes a factor for a decrease in the accuracy of focus adjustment and a decrease in the quality of the recorded image.

It is desirable to provide a mount adapter and an imaging device that prevent a decrease in the accuracy of focus adjustment due to an error of an AF sensor focal length.

According to an embodiment of the present disclosure, a mount adapter is provided with a camera cone, a focus detection unit, an optical device, and a correction information storage unit. The camera cone has a length of adjusting a flange focal length between an imaging device provided with an imaging element and an interchangeable lens. The focus detection unit carries out focus detection from a phase difference. The optical device separates an incident light from the interchangeable lens into an incident light of the imaging element and an incident light of the focus detection unit. The correction information storage unit stores correction information used for correction of an error between the flange focal length and a distance from a mounting surface of the interchangeable lens to the focus detection unit.

In addition, according to an embodiment of the present disclosure, an imaging device is provided with an information acquisition unit, a correction information storage unit, and a driving amount calculation unit. The information acquisition unit adjusts a flange focal length between an imaging device and an interchangeable lens and also acquires, from a mount adapter having a focus detection unit carrying out focus detection by separating an incident light from the interchangeable lens, correction information that is used for correction of an error between the flange focal length and a distance from a mounting surface of the interchangeable lens to the focus detection unit stored in the mount adapter and focus information that is detected by the focus detection unit. The correction information storage unit stores correction information used for correction of an error between the flange focal length and a distance from the mounting surface of the interchangeable lens to an imaging element. The driving amount calculation unit calculates a lens driving amount for focus adjustment from the correction information stored in the correction information storage unit and the correction information and the focus information acquired by the information acquisition unit.

According to the mount adapter and the imaging device above mentioned, a decrease in the accuracy of focus adjustment due to an error of the AF sensor focal length is prevented.

BRIEF DESCRIPTION OF THE DRAWINGS

FIG. 4 illustrates an example of a correction information table of the mount adapter in the embodiment;

FIG. 5 illustrates an example of a correction information table of the imaging device in the embodiment;

FIG. 9 is a flowchart of correction information acquisition process in the embodiment.

DETAILED DESCRIPTION OF EMBODIMENTS

A detailed description is given below to embodiments of the present disclosure with reference to the drawings.

Embodiment

Figure 1:
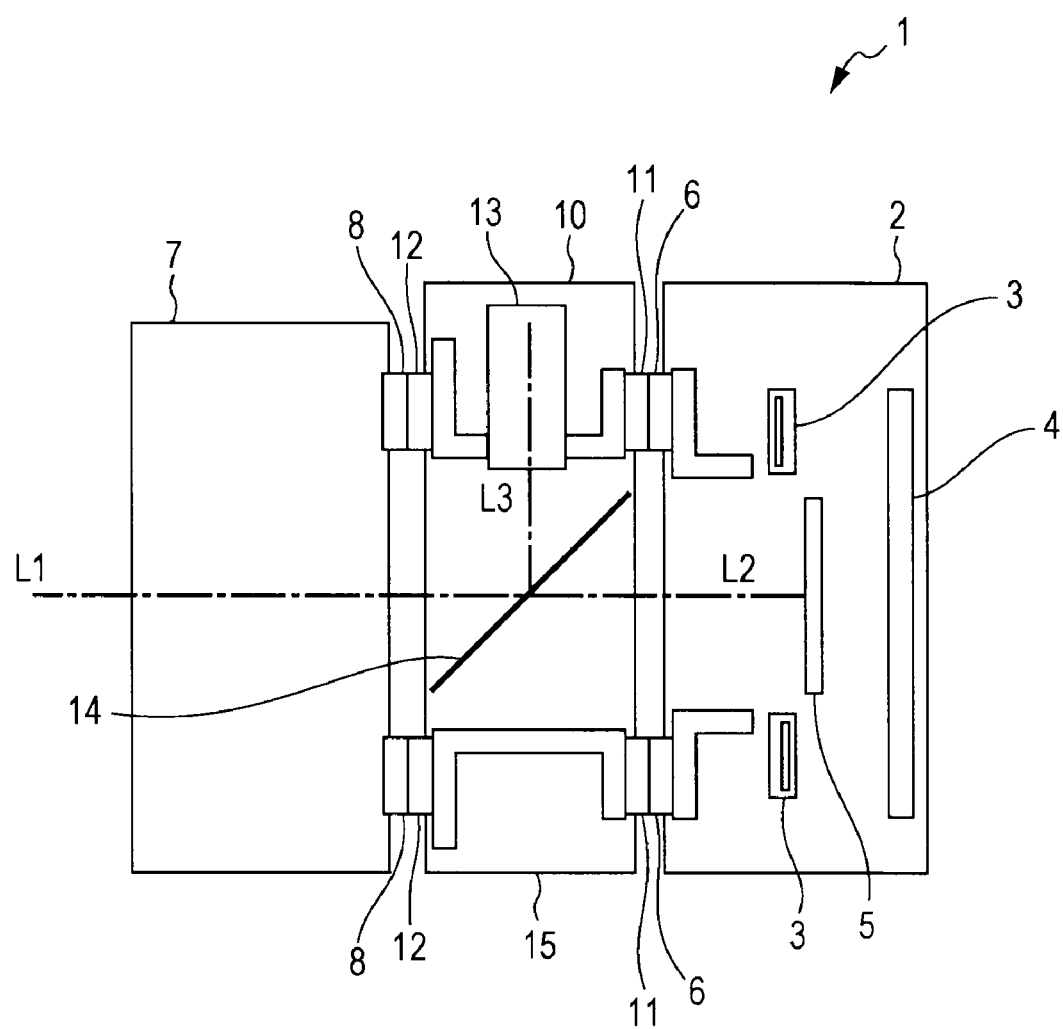
FIG. 1 illustrates a configuration example of an imaging system in an embodiment.

Firstly, an overall configuration of an imaging system in an embodiment is described using FIG. 1. FIG. 1 illustrates a configuration example of the imaging system in the embodiment.

An imaging system 1 is provided with an imaging device (camera body) 2, a mount adapter 10, and a lens (interchangeable lens) 7. The imaging device 2 is a camera body of a mirrorless digital single-lens camera that is intended to reduce size and weight by shortening a flange focal length than that of a digital single-lens reflex camera. The lens 7 is an interchangeable lens for a digital single-lens reflex camera, and it is difficult to be mounted directly to the imaging device 2 because of the different flange focal length. The lens 7 is sometimes difficult to be mounted due to the interface different from the imaging device 2.

The mount adapter 10 is mounted between the imaging device 2 and the lens 7. The mount adapter 10 regulates the flange focal lengths that differ in mirrorless digital single-lens cameras from digital single-lens reflex cameras. Since the flange focal length of a mirrorless digital single-lens camera is shorter than the flange focal length of a digital single-lens reflex camera, it is regulated to be a flange focal length compliant with the lens 7 by mounting the mount adapter 10.

The imaging device 2 is provided with a shutter 3, a backside LCD (liquid crystal display) 4, an imaging element 5, a mount 6, various operational units, such as other control devices, a battery, and a release button, not shown, various sensors, such as a temperature sensor, and the like. The imaging element 5 carries out imaging of a subject as well as an image output to make the backside LCD 4 function as an EVF and focus detection of a contrast system by detecting a light passing through the shutter 3.

The mount 6 is a joint portion to mount the imaging device 2 to a lens compliant with a mirrorless digital single-lens camera. The mount 6 has a joint portion shape to hold a lens and also has a contact to input and output various types of information, such as focus detection information (for example, ranging information and the like) and aperture value information, between the imaging device 2 and the lens.

The mount adapter 10 is provided with a mount 11, a mount 12, an AF sensor unit 13, a thin film mirror (pellicle mirror) 14, a camera cone 15, and others like control devices, a display unit, various operational units, a temperature sensor, and the like, not shown. The mount adapter 10 may also be equipped with a light transmissive lid portion (for example, a protective glass, a filter, or the like) not shown in an opening on the side of the imaging device 2 and in an opening on the side of the lens 7. The lid portion prevents dust and dirt from entering inside and also protects the AF sensor unit 13 and the thin film mirror 14 from being damaged due to an external force.

The mount 11 is a joint portion to mount the mount adapter 10 to the imaging device 2. The mount 11 has a joint portion shape to be held by the imaging device 2 and also has a contact to input and output various types of information, such as focus detection information and aperture value information, between the imaging device 2 and the mount adapter 10. The mount 12 is a joint portion to mount a lens compliant with a digital single-lens reflex camera to the mount adapter 10. The mount 12 has a joint portion shape to hold a lens and also has a contact to input and output various types of information, such as focus detection information and aperture value information, between the imaging device 2 and the lens.

The AF sensor unit (focus detection unit) 13 is configured to include optical members, such as a condenser lens, an IR (infrared) cut filter, an aperture mask, and a separator lens, and carries out focus detection of a phase difference system by introducing a light guided from a subject to the AF sensor. The AF sensor unit 13 outputs focus detection information used for focus adjustment, such as ranging information, for example. The AF sensor unit 13 is equipped at a position to be an AF sensor focal length compliant with a flange focal length of a digital single-lens reflex camera.

The thin film mirror 14 is an optical device to separate a light L1 incident from the subject side (lens 7 side) into a light L2 incident to the imaging element 5 and a light L3 incident to the AF sensor unit 13. The thin film mirror 14 is a fixed semi-transmissive thin film mirror, and for example, separates approximately 70% of the incident light L1 into the light L2 incident to the imaging element 5 and approximately 30% of the incident light L1 into the light L3 incident to the AF sensor unit 13.

The camera cone 15 is in an approximately cylindrical shape and has the AF sensor unit 13 and the thin film mirror 14 therein. The camera cone length of the camera cone 15 is, when mounted between the imaging device 2 and the lens 7, a length to make the distance from the mounting surface of the lens 7 to the imaging element 5 to be a flange focal length compliant with the lens 7. The camera cone 15 has the AF sensor unit 13 disposed on a folded optical path of the thin film mirror in the camera cone.

In such a manner, by regulating the flange focal length, the mount adapter 10 enables the lens 7 compliant with a digital single-lens reflex camera to be mounted to the imaging device 2, which is a mirrorless digital single-lens camera.

Even in a case that the interchangeable lens does not have an AF sensor, the mount adapter 10 has the AF sensor unit 13, thereby the imaging system 1 enables focus detection of a phase difference system.

In a case that the interchangeable lens neither has an AF sensor nor has the mount adapter 10 mounted thereto, the imaging device 2 carries out focus detection of a contrast system. Accordingly, the imaging device 2 carries out focus adjustment by switching focus detection of a phase difference system and focus detection of a contrast system corresponding to the mount adapter 10 or the interchangeable lens connected to the imaging device 2.

The lens 7 is an interchangeable lens compliant with a digital single-lens reflex camera. The lens 7 is provided with a mount 8 and also is provided with a driving mechanism driving the lens, an aperture adjustment mechanism adjusting the aperture, a control unit controlling the mechanism units, and the like.

The mount 8 is a joint portion to mount the lens 7 to a compliant digital single-lens reflex camera. The mount 8 has a joint portion shape to be held by a digital single-lens reflex camera and also has a contact to input and output various types of information, such as focus detection information and aperture value information, between the lens 7 and the digital single-lens reflex camera. The mount 8 also becomes a joint portion to mount the lens 7 to the mount adapter 10. The mount 8 can input and output various types of information, such as focus detection information and aperture value information, with the mount adapter 10 as well, similar to a digital single-lens reflex camera. The input and the output of information between the lens 7 and the mount adapter 10 may also be carried out directly by the control units of each other and may also be carried out via the control unit of the imaging device 2.

Figure 2:
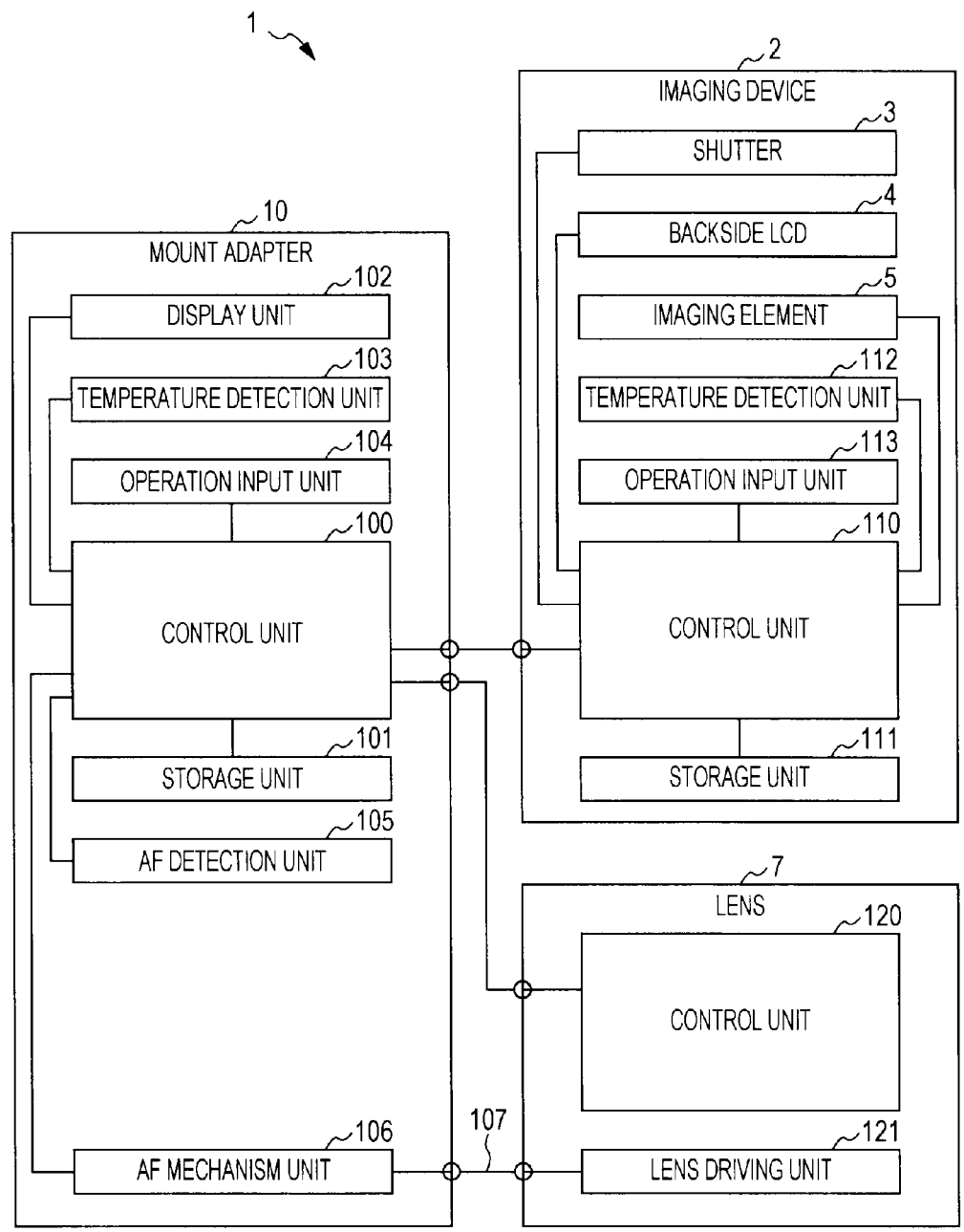
FIG. 2 illustrates a block configuration example of the imaging system in the embodiment.

Next, a block configuration of the imaging system 1 in the embodiment is described using FIG. 2. FIG. 2 illustrates a block configuration example of the imaging system in the embodiment.

The imaging device 2 is provided with a control unit 110, the shutter 3, the backside LCD (display unit) 4, the imaging element (imaging unit) 5, a storage unit (correction information storage unit) 111, a temperature detection unit 112, and an operation input unit 113. The control unit 110 integrally controls the imaging device 2 and also inputs and outputs various types of information with a control unit 100 of the mount adapter 10 described later.

The storage unit 111 stores, in advance, correction information to correct an error between the actual flange focal length of the imaging device 2 and the design value. The storage unit 111 is configured with a non-volatile storage medium, such as a flash memory and an EEPROM (electrically erasable programmable ROM), for example, to hold the correction information even during power off. Although the correction information is specifically a correction value, such as a lens shift amount, it may also be an error numerical value from the flange focal length as long as it is information to correct the lens shift amount based on an error. Since the error from the flange focal length of the imaging device 2 varies in association with the change in temperature, the correction information includes a plurality of items of information corresponding to the temperature. The temperature of the imaging device 2 is detected by the temperature detection unit (temperature sensor) 112.

The operation input unit 113 is a release button, other operation switches, and the like, and it accepts operations to select and perform a function included in the imaging system 1, such as an AF operation, an operation of the shutter 3, and display switch. The backside LCD 4 functions as an EVF and also carries out reproduction display of photographed images and user interface screen display for various operations. For example, user interface screen display carries out guidance display for an AF operation.

The mount adapter 10 is provided with the control unit 100, a storage unit (correction information storage unit) 101, a display unit 102, a temperature detection unit 103, an operation input unit 104, an AF detection unit (AF sensor unit) 105, and an AF mechanism unit 106. The control unit 100 integrally controls the mount adapter 10 and also inputs and outputs various types of information with the control unit 110 of the imaging device 2. The control unit 100 also inputs and outputs various types of information with a control unit 120 of the lens 7. The control unit 100 has a relay function in a case of transmitting various types of information to each other between the control unit 110 and the control unit 120.

The storage unit 101 stores, in advance, correction information to correct an error between the sensor focal length of the AF detection unit 105 and the design value of the flange focal length. The storage unit 101 is configured with a non-volatile storage medium, such as a flash memory and an EEPROM, for example, to hold the correction information even during power off. Although the correction information is specifically a correction value, such as a lens shift amount, it may also be an error numerical value from the flange focal length as long as it is information to correct the lens shift amount based on an error. Since the error from the sensor focal length of the mount adapter 10 varies in association with the change in temperature, the correction information includes a plurality of items of information corresponding to the temperature. The temperature of the mount adapter 10 is detected by the temperature detection unit (temperature sensor) 103.

The operation input unit 104 is an AF operation button, other operation switches, and the like, and it accepts operations to select and perform a function included in the mount adapter 10, such as an AF operation, an operation of the shutter 3, and display switch. The display unit 102 carries out notification display of the AF detection state of the AF detection unit 105. For example, the display unit 102 is an LED (light emitting diode) and carries out guidance display of the AF detection state of the AF detection unit 105 as just focus, near focus, or far focus.

The AF mechanism unit 106 is an actuator, such as a motor, and the driving amount is controlled by the control unit 100. The AF mechanism unit 106 transmits a driving force by being mechanically connected to the lens driving unit 121 of the lens 7 (driving force transmission unit) and carries out focus adjustment by driving the lens of the lens 7. At this time, the control unit 100 calculates the driving amount of the AF mechanism unit 106, calculated from the focus information detected by the AF detection unit 105, using the correction information of the imaging device 2 and the correction information of the mount adapter 10.

The lens 7 is provided with the control unit 120 and the lens driving unit 121. The control unit 120 integrally controls the lens 7 and also inputs and outputs various types of information with the control unit 100 of the mount adapter 10. In a case that the lens 7 is provided with an aperture adjustment mechanism unit, an information display unit, and the like, not shown, the control unit 120 controls them. The lens 7 may also be provided with a driving unit that drives the lens driving unit 121, and in that case, the control unit 120 drives the driving unit by receiving a direction for the driving amount after correction from the control unit 100.

In such a manner, the imaging system 1 enables the imaging device 2 to be mountable to the lens 7 compliant with a digital single-lens reflex camera. Then, the imaging system 1 enables focus adjustment in which the influence of the flange focal length error accumulated in the imaging device 2 and the mount adapter 10 is reduced.

Figure 3:
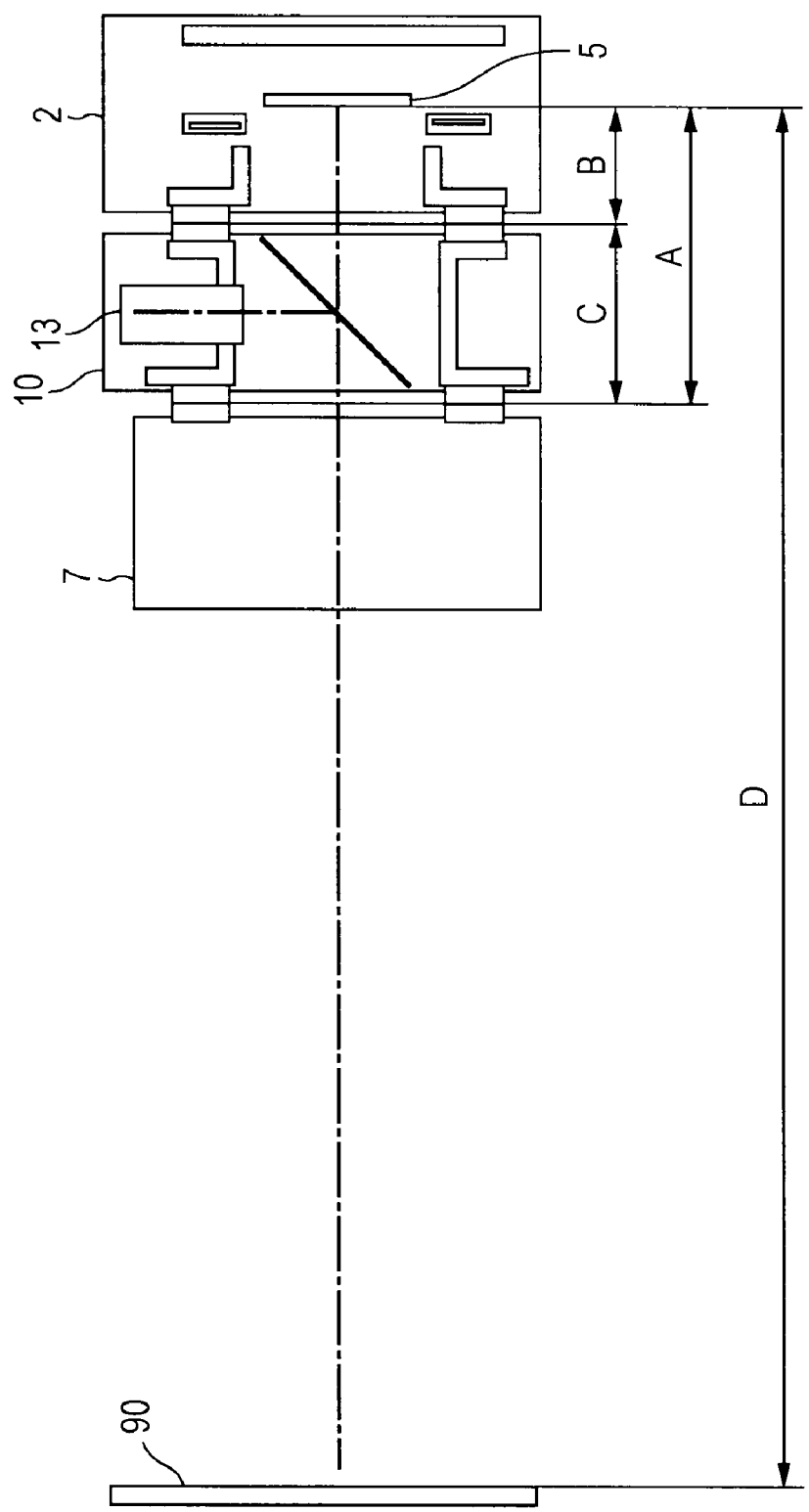
FIG. 3 illustrates a regulation example of an imaging device and a mount adapter in the embodiment.

Next, a regulation example of the imaging system 1 in the embodiment is described using FIGS. 3 through 5. FIG. 3 illustrates a regulation example of an imaging device and a mount adapter in the embodiment. FIG. 4 illustrates an example of a correction information table of the mount adapter in the embodiment. FIG. 5 illustrates an example of a correction information table of the imaging device in the embodiment.

The imaging system 1 has a configuration, as described above, in which the imaging element 5 is provided in the imaging device 2 and the AF sensor unit 13 is provided in the mount adapter 10. Therefore, due to the variation in dimension accuracy, variation upon treatment, and the like, the imaging system 1 has an error from the flange focal length (design value) in each of the distance from the mounting surface of the lens 7 to the imaging element 5 and the distance from the mounting surface of the lens 7 to the AF sensor unit 13. Since the imaging device 2 and the mount adapter 10 are considered to be often shipped to the market as independent commercial products respectively, it is difficult to regulate them in advance in combination of a specific imaging device 2 and a specific mount adapter 10. Accordingly, depending on the combination of an imaging device 2 and a mount adapter 10, the imaging system 1 is difficult to obtain sufficient accuracy of focus adjustment.

With that, the imaging system 1 can improve the accuracy of focus adjustment by carrying out regulation of storing, in advance, correction information to correct an error from the flange focal length in each of the imaging device 2 and the mount adapter 10.

Firstly, in a case of measuring the error of the mount adapter 10, the imaging system 1 carries out focus detection using a reference chart 90 by mounting the imaging device 2 and the lens 7 to the mount adapter 10. At this time, reference items are used for the imaging device 2 and the lens 7. Since a focal distance D, a flange focal length A, and a length B on the side of the imaging device in the flange focal length are already given, a length C on the side of the mount adapter in the flange focal length is to be measured. This does not match with (flange focal length A)−(length B on the side of the imaging device in the flange focal length), which is an already given value (design value), in all cases and sometimes has an error. The storage unit 101 stores the error value or a correction amount that corrects the error value as correction information in correspondence with a temperature, which is an environmental condition during regulation. For example, as shown in a mount adapter side correction information table 130, in an environment at 20° C., the storage unit 101 measures dm20 in correspondence with 20° C. for storage. Although error measurement may be carried out at from 0° C. to 40° C., which is a temperature in a range of the condition of use, the measurement may also be obtained by applying it to the error variation relative to the given change in temperature.

Regarding the measurement of the length C on the side of the mount adapter in the flange focal length, focus detection is carried out for the reference chart 90 with the AF sensor unit 13 to define the amount of adjustment desired for focus adjustment as an error. Regarding the correction information, the amount of adjustment desired for the focus adjustment is calculated from the shift (driving) of the lens.

Then, in a case of measuring the error of the imaging device 2, the imaging system 1 carries out focus detection using the reference chart 90 by mounting the mount adapter 10 and the lens 7 to the imaging device 2. At this time, reference items are used for the mount adapter 10 and the lens 7. At this time, since the focal distance D, the flange focal length A, and the length C on the side of the mount adapter in the flange focal length are already given, the length B on the side of the imaging device in the flange focal length is measured. This does not match with (flange focal length A)−(length C on the side of the mount adapter in the flange focal length), which is an already given value (design value), in all cases and sometimes has an error. The storage unit 111 stores the error value or a correction amount that corrects the error value in correspondence with a temperature, which is an environmental condition during regulation. For example, as shown in an imaging device side correction information table 140, in an environment at 20° C., the storage unit 111 measures db20 in correspondence with 20° C. for storage. Although error measurement may be carried out at from 0° C. to 40° C., which is a temperature in a range of the condition of use, the measurement may also be obtained by applying it to the error variation relative to the given change in temperature.

Regarding the measurement of the length B on the side of the imaging device in the flange focal length, focus detection is carried out for the reference chart 90 with the AF sensor unit 13 to define the amount of adjustment desired for focus adjustment as an error. Regarding the correction information, the amount of adjustment desired for the focus adjustment is calculated from the shift (driving) of the lens.

Figure 6:
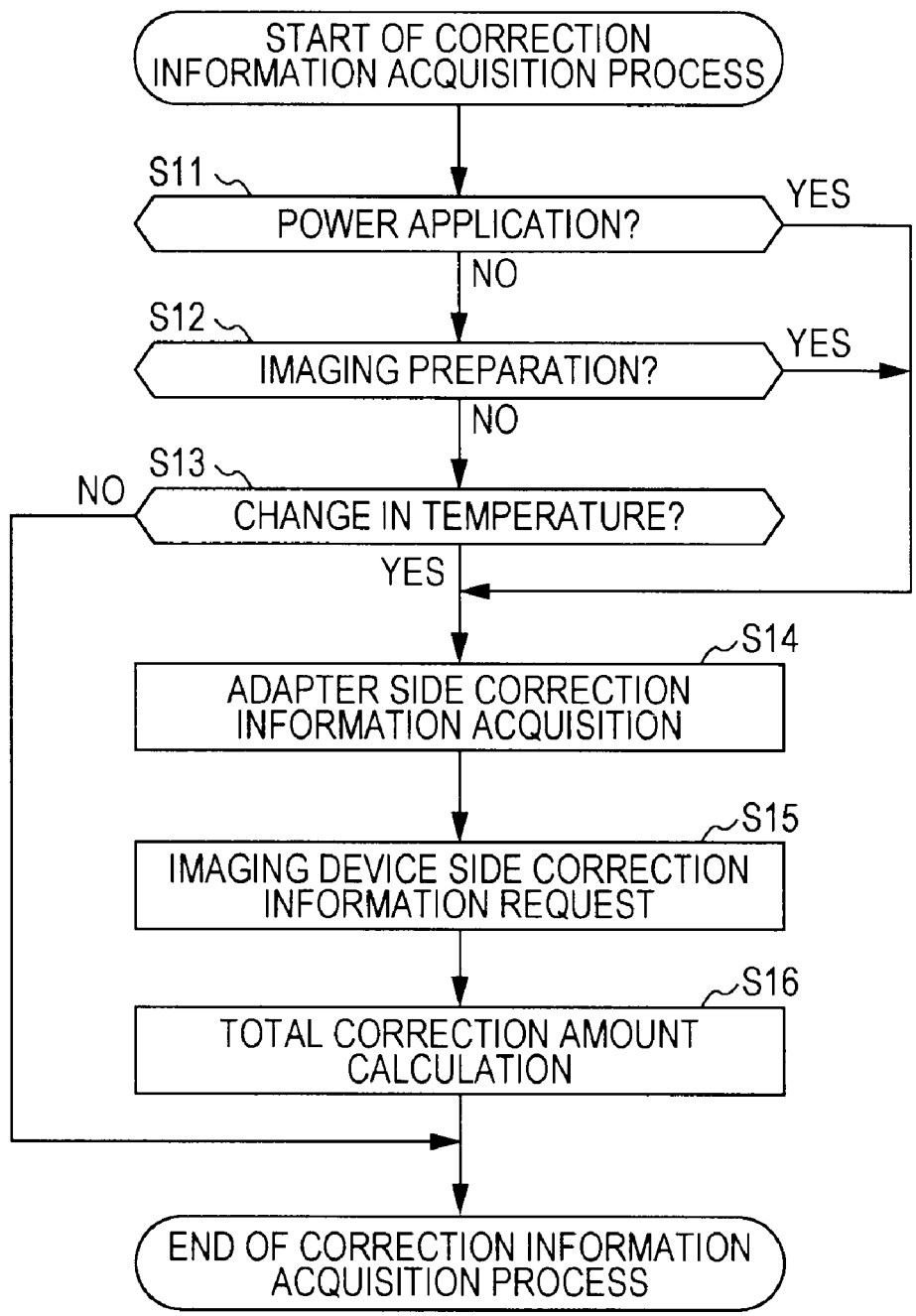
FIG. 6 is a flowchart of correction information acquisition process in the embodiment.

Next, correction information acquisition process performed by the control unit 100 of the mount adapter 10 is described using FIG. 6. FIG. 6 is a flowchart of correction information acquisition process in the embodiment.

[Step S11]

The control unit 100 determines power application to the imaging system 1. The power application to the imaging system 1 is determined by power supply to the control unit 100. The control unit 100 goes on to step S14 in a case that power application takes place, and goes on to step S12 in a case that power application does not take place (already in a state of power application).

The power application to the imaging system 1 may also be determined by receiving power application notification from the control unit 110 of the imaging device 2. This allows the mount adapter 10 to detect power application to the imaging device 2 in a state of mounting the mount adapter 10 to the imaging device 2 as well as power application, by mounting the mount adapter 10, in a state of applying power to the imaging device 2. In such a manner, the control unit 100 functions as a power application detection unit that detects power application to the imaging device 2 or a connection detection unit that detects connection (mounting) to the imaging device 2.

[Step S12]

The control unit 100 determines imaging preparation of the imaging system 1. The imaging preparation of the imaging system 1 is determined by receiving imaging preparation notification from the control unit 110 of the imaging device 2. The imaging preparation notification is, for example in a case that the control unit 110 detects switching of the imaging mode of the imaging device 2 or a half press (AF operation) of the release button, a signal notifies the control unit 100 from the control unit 110. The imaging preparation of the imaging system 1 is determined by that the control unit 100 receives an AF operation input from the operation input unit 104 of the mount adapter 10. The control unit 100 goes on to step S14 in a case of determining that imaging preparation takes place, and goes on to step S13 in a case of determining that imaging preparation does not take place. In such a manner, the control unit 100 functions as a reception unit that accepts an AF operation (operation of starting the focus detection) of the mount adapter 10 and as an operation detection unit that detects an operation of starting the focus detection of the imaging device 2.

[Step S13]

The control unit 100 determines a change in temperature of the mount adapter 10. For example, in a case that there is a change in temperature exceeding a predetermined threshold from the temperature at the time of the previous error acquisition, it determines that there is a change in temperature. The control unit 100 goes on to step S14 in a case of determining that there is a change in temperature, and terminates the correction information acquisition process in a case of determining that there is no change in temperature.

The threshold may be variable in accordance with, for example, a focal depth, and the threshold is set to be large in a case of a deep focal depth and the threshold is set to be small in a case of a shallow focal depth, thereby the correction frequency can be appropriate.

[Step S14]

The control unit 100 acquires adapter side correction information of the mount adapter 10 from the mount adapter side correction information table 130 stored in the storage unit 101.

[Step S15]

The control unit 100 acquires imaging device side correction information by requesting it to the imaging device 2. At this time, in response to the acquisition request for the imaging device side correction information from the control unit 100, the control unit 110 of the imaging device 2 acquires the imaging device side correction information of the imaging device 2 from the imaging device side correction information table 140 stored in the storage unit 111. In such a manner, the control unit 100 functions as an imaging device side correction information acquisition unit that acquires the imaging device side correction information of the imaging device 2. The control unit 110 notifies the control unit 100 of the imaging device side correction information thus acquired. In such a manner, the control unit 110 functions as an imaging device side correction information output unit that outputs the imaging device side correction information of the imaging device 2.

[Step S16]

The control unit 100 calculates a total correction amount from the adapter side correction information and the imaging device side correction information thus acquired and stores it together with the temperature at the time of acquisition in the storage unit 101 to terminate the correction information acquisition process. In such a manner, the control unit 100 functions as a correction amount calculation unit that calculates a correction amount of lens driving for the focus adjustment.

Figure 7:
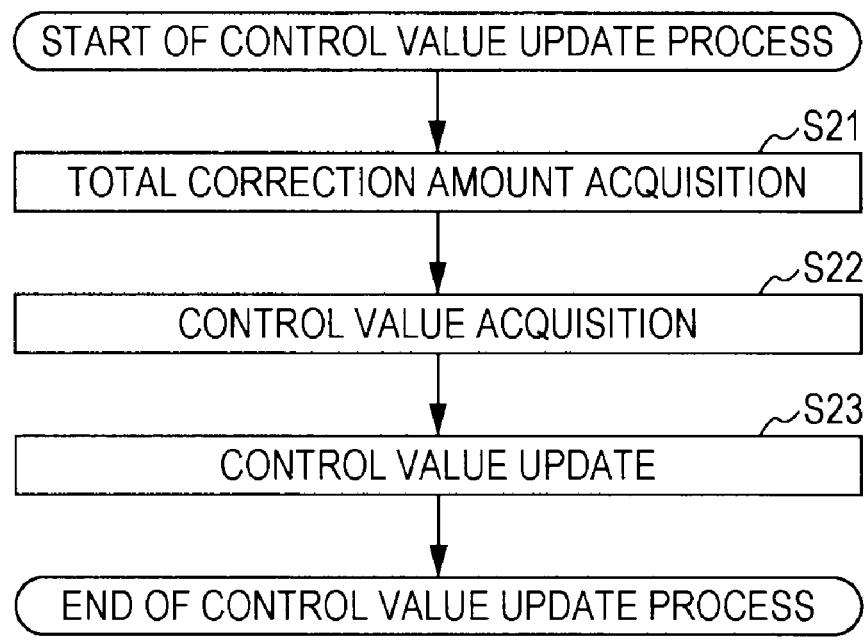
FIG. 7 is a flowchart of control value update process in the embodiment.

Next, control value update process performed by the control unit 100 of the mount adapter 10 is described using FIG. 7. FIG. 7 is a flowchart of control value update process in the embodiment.

[Step S21]

The control unit 100 acquires the total correction amount from the storage unit 101.

[Step S22]

The control unit 100 acquires a control value of the AF mechanism unit 106 for focus adjustment based on the focus detection carried out by the AF detection unit 105. The control value of the AF mechanism unit 106 can be calculated by the control unit 100. In such a manner, the control unit 100 functions as a driving amount calculation unit that calculates a control value (driving amount) of the AF mechanism unit 106.

[Step S23]

The control unit 100 updates the control value by correcting the control value based on the total correction amount to terminate the control value update process.

In such a manner, when carrying out focus adjustment based on focus detection of a phase difference system, the mount adapter 10 can prevent a decrease in the accuracy of focus adjustment due to an error of the AF sensor focal length.

Another Embodiment

Next, an imaging system in another embodiment is described. Whereas the calculation entity of the total correction amount is a mount adapter in the embodiment described above, the other embodiment differs at the point to be an imaging device. In the detailed description in the other embodiment, a description of the overall configuration of the imaging system is omitted unless otherwise specified to consider it to be same as that in the embodiment described above.

Figure 8:
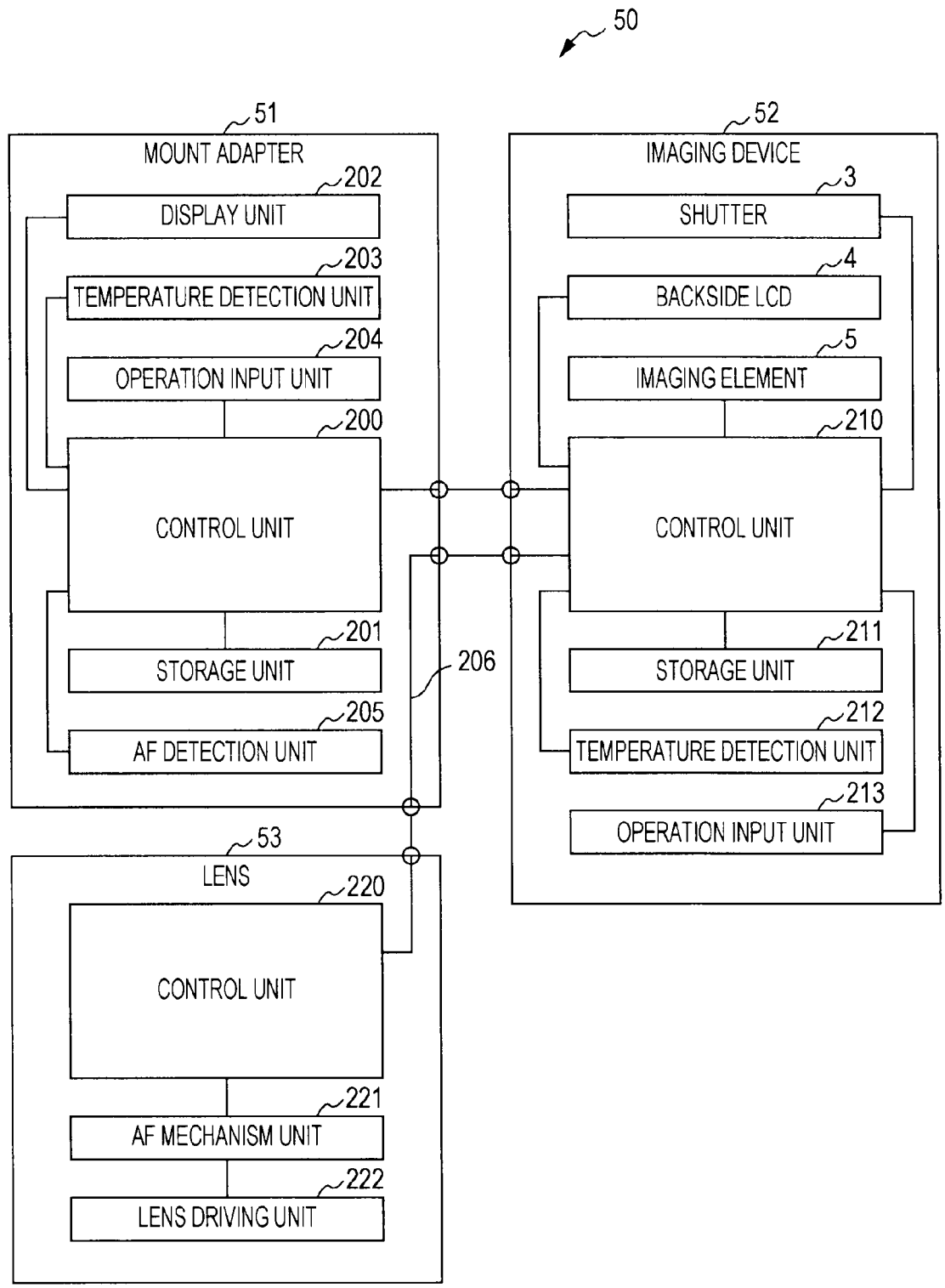
FIG. 8 illustrates a block configuration example of an imaging system in another embodiment.

A block configuration of an imaging system 50 in the embodiment is described using FIG. 8. FIG. 8 illustrates a block configuration example of the imaging system 50 in the embodiment.

An imaging device 52 is provided with a control unit 210, a shutter 3, a backside LCD (display unit) 4, an imaging element (imaging unit) 5, a storage unit (correction information storage unit) 211, a temperature detection unit 212, and an operation input unit 213. The control unit 210 integrally controls the imaging device 52 and also inputs and outputs various types of information with a control unit 200 of a mount adapter 51 described later. The control unit 210 inputs and outputs various types of information with a control unit 220 of a lens 53. The control unit 210 has a relay function in a case of transmitting various types of information to each other between the control unit 200 and the control unit 220. For example, the control unit 210 acquires focus information detected by an AF detection unit 205 and correction information stored in a storage unit 201 from the control unit 200. At this time, the control unit 210 functions as an information acquisition unit that acquires information from the control unit 200.

The storage unit 211 stores, in advance, correction information to correct an error between the actual flange focal length of the imaging device 52 and the design value. The storage unit 211 is configured with a non-volatile storage medium, such as a flash memory and an EEPROM, for example, to hold the correction information even during power off. Although the correction information is specifically a correction value, such as a lens shift amount, it may also be an error numerical value from the flange focal length as long as it is information to correct the lens shift amount based on an error. Since the error from the flange focal length of the imaging device 52 varies in association with the change in temperature, the correction information includes a plurality of items of information corresponding to the temperature. The temperature of the imaging device 52 is detected by the temperature detection unit (temperature sensor) 212.

The operation input unit 213 is a release button, other operation switches, and the like, and it accepts operations to select and perform a function included in the imaging system 1, such as an AF operation, an operation of the shutter 3, and display switch. The backside LCD 4 functions as an EVF and also carries out reproduction display of photographed images and user interface screen display for various operations. For example, user interface screen display carries out guidance display for an AF operation.

The mount adapter 51 is provided with the control unit 200, a storage unit (correction information storage unit) 201, a display unit 202, a temperature detection unit 203, an operation input unit 204, and an AF detection unit (AF sensor unit) 205. The control unit 200 integrally controls the mount adapter 51 and also inputs and outputs various types of information with the control unit 210 of the imaging device 52. The mount adapter 51 has a relay unit 206 that carries out information transmission between the control unit 210 and the control unit 220.

The storage unit 201 stores, in advance, correction information to correct an error between the sensor focal length of the AF detection unit 205 and the design value of the flange focal length. The storage unit 201 is configured with a non-volatile storage medium, such as a flash memory and an EEPROM, for example, to hold the correction information even during power off. Although the correction information is specifically a correction value, such as a lens shift amount, it may also be an error numerical value from the flange focal length as long as it is information to correct the lens shift amount based on an error. Since the error from the sensor focal length of the mount adapter 51 varies in association with the change in temperature, the correction information includes a plurality of items of information corresponding to the temperature. The temperature of the mount adapter 51 is detected by the temperature detection unit (temperature sensor) 203.

The operation input unit 204 is an AF operation button, other operation switches, and the like, and it accepts operations to select and perform a function included in the mount adapter 51, such as an AF operation, an operation of the shutter 3, and display switch. The display unit 202 carries out notification display of the AF detection state of the AF detection unit 205. For example, the display unit 202 is an LED and carries out guidance display of the AF detection state of the AF detection unit 205 as just focus, near focus, or far focus.

The lens 53 is provided with the control unit 220, an AF mechanism unit 221, and a lens driving unit 222. The control unit 220 integrally controls the lens 53 and also inputs and outputs various types of information with the control unit 210 of the imaging device 52. In a case that the lens 53 is provided with an aperture adjustment mechanism unit, an information display unit, and the like, not shown, the control unit 220 controls them. The control unit 220 drives the AF mechanism unit 221 by receiving a direction of the driving amount after correction from the control unit 210. At this time, the control unit 210 calculates the driving amount of the AF mechanism unit 221 calculated from the focus information detected by the AF detection unit 205 using the correction information of the imaging device 52 and the correction information of the mount adapter 51. In this case, the control unit 210 functions as a driving amount calculation unit that calculates a control value (driving amount) of the AF mechanism unit 221.

The AF mechanism unit 221 is an actuator, such as a motor, and the driving amount is controlled by the control unit 220. The AF mechanism unit 221 is mechanically connected to the lens driving unit 222 and carries out focus adjustment by driving the lens.

In such a manner, the imaging system 50 enables the imaging device 52 to be mountable to the lens 53 compliant with a digital single-lens reflex camera. Then, the imaging system 50 enables focus adjustment in which the influence of the flange focal length error accumulated in the imaging device 52 and the mount adapter 51 is reduced.

Next, correction information acquisition process performed by the control unit 210 of the imaging device 52 is described using FIG. 9. FIG. 9 is a flowchart of correction information acquisition process in the embodiment.

[Step S31]

The control unit 210 determines power application to the imaging device 52. The power application to the imaging device 52 is determined by detecting power supply to the control unit 210. In such a manner, the control unit 210 functions as a power application detection unit that detects power application to the imaging device 52. The control unit 210 goes on to step S35 in a case that power application takes place, and goes on to step S32 in a case that power application does not take place (already in a state of power application).

[Step S32]

The control unit 210 determines adapter mounting of the imaging device 52. The control unit 210 detects the adapter mounting of the imaging device 52 by mounting notification from the control unit 200. In such a manner, the control unit 210 functions as a connection detection unit that detects the adapter mounting (connection) of the imaging device 52. The control unit 210 goes on to step S35 in a case that the adapter mounting takes place, and goes on to step S33 in a case that the adapter mounting does not take place (already in a state of mounting).

[Step S33]

The control unit 210 determines imaging preparation of the imaging system 50. The imaging preparation of the imaging system 50 is determined based on an imaging preparation state detected by the control unit 210. The imaging preparation state is, for example, a case that the control unit 210 detects switching of the imaging mode of the imaging device 52 or a half press (AF operation) of the release button. The imaging preparation of the imaging system 50 is determined by that the control unit 210 receives imaging preparation notification from the control unit 200. The imaging preparation notification is, for example, notified by that the control unit 200 receives an AF operation input from the operation input unit 204 of the mount adapter 51. The control unit 210 goes on to step S35 in a case of determining that imaging preparation takes place, and goes on to step S34 in a case of determining that imaging preparation does not take place. In such a manner, the control unit 210 functions as a reception unit that accepts an AF operation (operation of starting the focus detection) of the imaging device 52 and as an operation detection unit that detects an operation of starting the focus detection of the mount adapter 51.

[Step S34]

The control unit 210 determines a change in temperature of the imaging device 52. For example, in a case that there is a change in temperature exceeding a predetermined threshold from the temperature at the time of the previous error acquisition, it determines that there is a change in temperature. The control unit 210 goes on to step S35 in a case of determining that there is a change in temperature, and terminates the correction information acquisition process in a case of determining that there is no change in temperature.

The threshold may be variable in accordance with, for example, a focal depth, and the threshold is set to be large in a case of a deep focal depth and the threshold is set to be small in a case of a shallow focal depth, thereby the correction frequency can be appropriate.

[Step S35]

The control unit 210 acquires imaging device side correction information of the imaging device 52 from the imaging device side correction information table 140 stored in the storage unit 211.

[Step S36]

The control unit 210 acquires mount adapter side correction information by requesting it to the mount adapter 51. At this time, in response to the acquisition request for the mount adapter side correction information from the control unit 210, the control unit 200 of the mount adapter 51 acquires the mount adapter side correction information of the mount adapter 51 from the mount adapter side correction information table 130 stored in the storage unit 201. In such a manner, the control unit 210 functions as a mount adapter side correction information acquisition unit that acquires the mount adapter side correction information of the mount adapter 51. The control unit 200 notifies the control unit 210 of the mount adapter side correction information thus acquired. In such a manner, the control unit 200 functions as a mount adapter side correction information output unit that outputs the mount adapter side correction information of the mount adapter 51.

[Step S37]

The control unit 210 calculates a total correction amount from the mount adapter side correction information and the imaging device side correction information thus acquired and stores it together with the temperature at the time of acquisition in the storage unit 211 to terminate the correction information acquisition process. In such a manner, the control unit 210 functions as a correction amount calculation unit that calculates a correction amount of lens driving for the focus adjustment.

In such a manner, when carrying out focus adjustment based on focus detection of a phase difference system, the imaging device 52 can prevent a decrease in the accuracy of focus adjustment due to an error of the AF sensor focal length.

The control units 100, 110, and 120 described in the former embodiment and the control units 200, 210, and 220 described in the latter embodiment are controlled by a CPU (central processing unit). The CPU is connected to a RAM (random access memory), a ROM (read only memory), a communication interface, and an input and output interface via a bus.

In the RAM, at least a part of OS (operating system) programs and application programs to be performed by the CPU is stored temporarily. In the RAM, various types of data desired for process by the CPU are stored. In the ROM, OS programs and application programs are stored. The communication interface is connected to other control units via communication lines.

The input and output interface is connected to the respective input and output units. With the hardware configuration as described above, the process functions of the embodiments can be realized.

Each control unit can also be configured to respectively include a module composed of a FPGA (field programmable gate array), a DSP (digital signal processor), or the like, and can also be configured not to have a CPU. In that case, each control unit is provided with a respective non-volatile memory and stores a firmware of the module. The firmware can be written in the non-volatile memory via a portable recording medium or a communication interface. In such a manner, each control unit can also be updated with a firmware by rewriting the firmware stored in the non-volatile memory.

A variety of modifications can be made to the embodiments described above without departing from the scope of embodiments.

Further, the embodiments described above can also be variously altered and modified by those skilled in the art and they are not limited to the exact configuration and the applications described above.

The present disclosure contains subject matter related to that disclosed in Japanese Priority Patent Application JP 2010-184620 filed in the Japan Patent Office on Aug. 20, 2010, the entire contents of which are hereby incorporated by reference.

What is claimed is:

1. A mount adapter comprising:
a camera cone having a length of adjusting a flange focal length between an imaging device provided with an imaging element and an interchangeable lens;
a focus detection unit carrying out focus detection from a phase difference;
an optical device separating an incident light from the interchangeable lens into an incident light of the imaging element and an incident light of the focus detection unit; and
a correction information storage unit storing correction information used for correction of an error between the flange focal length and a distance from a mounting surface of the interchangeable lens to the focus detection unit.

2. The mount adapter according to claim 1, further comprising:
a correction information acquisition unit acquiring correction information, used for correction of an error of the flange focal length on an imaging device side and stored in the imaging device, from the imaging device; and
a correction amount calculation unit calculating a correction amount of lens driving for focus adjustment from the correction information stored in the correction information storage unit and the correction information acquired by the correction information acquisition unit.

3. The mount adapter according to claim 2, further comprising a correction amount output unit outputting the correction amount to the imaging device.

4. The mount adapter according to claim 2, further comprising:
a driving amount calculation unit calculating a driving amount of an actuator by correcting with the correction amount; and
a driving force transmission unit transmitting a driving force of the actuator to the interchangeable lens.

5. The mount adapter according to claim 2, further comprising a power application detection unit detecting power application to the imaging device, wherein
the correction amount calculation unit calculates the correction amount based on the detection of the power application to the imaging device.

6. The mount adapter according to claim 2, further comprising a connection detection unit detecting connection to the imaging device, wherein
the correction amount calculation unit calculates the correction amount based on the detection of the connection to the imaging device.

7. The mount adapter according to claim 2, further comprising a temperature detection unit detecting a temperature, wherein
the correction information storage unit stores the correction information corresponding to the temperature.

8. The mount adapter according to claim 7, further comprising a reception unit accepting a starting operation of the focus detection, wherein
the correction amount calculation unit calculates the correction amount based on the acceptance of the starting operation of the focus detection by the reception unit.

9. The mount adapter according to claim 7, further comprising an operation detection unit detecting a starting operation of the focus detection in the imaging device, wherein
the correction amount calculation unit calculates the correction amount based on the detection of the starting operation of the focus detection in the operation detection unit.

10. The mount adapter according to claim 1, wherein
the optical device is a semi-transmissive thin film mirror, and
the focus detection unit is disposed in a folded optical path of the thin film mirror in the camera cone.

11. The mount adapter according to claim 1, further comprising a display unit displaying a focus detection state by the focus detection unit.

12. An imaging device, comprising:
an information acquisition unit, adjusting a flange focal length between an imaging device and an interchangeable lens, and also acquiring, from a mount adapter having a focus detection unit carrying out focus detection by separating an incident light from the interchangeable lens, correction information that is used for correction of an error between the flange focal length and a distance from a mounting surface of the interchangeable lens to the focus detection unit stored in the mount adapter and focus information that is detected by the focus detection unit;
a correction information storage unit storing correction information used for correction of an error between the flange focal length and a distance from the mounting surface of the interchangeable lens to an imaging element; and
a driving amount calculation unit calculating a lens driving amount for focus adjustment from the correction information stored in the correction information storage unit and the correction information and the focus information acquired by the information acquisition unit.

13. The imaging device according to claim 12, further comprising a power application detection unit detecting power application to the imaging device, wherein
the driving amount calculation unit calculates the lens driving amount based on the detection of the power application to the imaging device.

14. The imaging device according to claim 12, further comprising a connection detection unit detecting connection to the mount adapter, wherein
the driving amount calculation unit calculates the lens driving amount based on the detection of the connection to the mount adapter.

15. The imaging device according to claim 12, further comprising a temperature detection unit detecting a temperature, wherein
the correction information storage unit stores the correction information corresponding to the temperature.

16. The imaging device according to claim 15, further comprising a reception unit accepting a starting operation of the focus detection, wherein
the driving amount calculation unit calculates the lens driving amount based on the acceptance of the starting operation of the focus detection by the reception unit.

17. The imaging device according to claim 15, further comprising an operation detection unit detecting a starting operation of the focus detection in the mount adapter, wherein
the driving amount calculation unit calculates the lens driving amount based on the detection of the starting operation of the focus detection in the operation detection unit.

* * * * *